(12) United States Patent
Yang et al.

(10) Patent No.: US 9,139,776 B2
(45) Date of Patent: Sep. 22, 2015

(54) COMPOSITE COMPRISING A POLYMER AND A BLUE PHASE LIQUID CRYSTAL, A METHOD FOR PREPARING THE COMPOSITE, AND A LIQUID CRYSTAL DISPLAY DEVICE COMPRISING THE COMPOSITE

(71) Applicant: BOE Technology Group Co., Ltd., Beijing (CN)

(72) Inventors: Huai Yang, Beijing (CN); Ling Wang, Beijing (CN); Wanli He, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 193 days.

(21) Appl. No.: 14/058,662

(22) Filed: Oct. 21, 2013

(65) Prior Publication Data

US 2014/0111759 A1 Apr. 24, 2014

(30) Foreign Application Priority Data

Oct. 24, 2012 (CN) .......................... 2012 1 0409249

(51) Int. Cl.
| | | |
|---|---|---|
| *C09K 19/54* | (2006.01) | |
| *C09K 19/02* | (2006.01) | |
| *C09K 19/52* | (2006.01) | |

(52) U.S. Cl.
CPC ........... *C09K 19/542* (2013.01); *C09K 19/0275* (2013.01); *C09K 19/54* (2013.01); *C09K 19/544* (2013.01); *C09K 19/52* (2013.01); *C09K 2019/546* (2013.01)

(58) Field of Classification Search
CPC .... C09K 19/0275; C09K 19/52; C09K 19/54; C09K 19/542; C09K 19/544; C09K 2019/546
See application file for complete search history.

(56) References Cited

U.S. PATENT DOCUMENTS

| 9,039,930 B2 * | 5/2015 | Lan et al. ................... 252/299.5 |
| 2008/0280071 A1 | 11/2008 | Kikuchi et al. |
| 2009/0115957 A1 * | 5/2009 | Coles et al. .................... 349/167 |
| 2009/0322997 A1 | 12/2009 | Kaihoko et al. |
| 2010/0091228 A1 * | 4/2010 | Kim et al. ...................... 349/122 |
| 2011/0210917 A1 * | 9/2011 | LaFave et al. ................. 345/160 |
| 2011/0234572 A1 * | 9/2011 | Toko .............................. 345/211 |
| 2012/0235088 A1 | 9/2012 | Kilickiran et al. |
| 2013/0341566 A1 * | 12/2013 | Hsieh ........................ 252/299.67 |
| 2014/0002774 A1 * | 1/2014 | Lan et al. .......................... 349/93 |

FOREIGN PATENT DOCUMENTS

| CN | 102234514 A | 11/2011 |
| CN | 102517040 A | 6/2012 |
| CN | 102652167 A | 8/2012 |
| CN | 102902092 A | 1/2013 |
| JP | 3779937 B | 10/2006 |
| WO | WO 2011/120637 | 10/2011 |

OTHER PUBLICATIONS

First Office Action issued by Chinese Patent Office for priority application 201210409249.9 dated Nov. 5, 2013.
Second Office Action issued by Chinese Patent Office for priority application 201210409249.9 dated Apr. 24, 2014.
Extended Search Report from European Patent Office for corresponding application 13188885.1 dated Sep. 26, 2014.
Office Action from Korean Patent Office for corresponding application 10-2013-0124438 dated Oct. 20, 2014 with full English translation.

* cited by examiner

*Primary Examiner* — Shean C Wu
(74) *Attorney, Agent, or Firm* — Frommer Lawrence & Haug LLP

(57) ABSTRACT

The present invention relates to a composite comprising a polymer and a blue phase liquid crystal (BPLC). The polymer is a crosslinked and non-liquid crystalline polymer, the BPLC is dispersed in said polymer, and the ratio of the polymer to the BPLC by weight ($W_p/W_l$) satisfies the relationship: $12:88<W_p/W_l \leq 30:70$, wherein the $W_p$ is the weight of the polymer, and $W_l$ is the weight of the BPLC. The composite exhibits a very wide temperature range of blue phase of the BPLC, and can respond to an electric field at a millisecond level. The composite has an excellent stability, and a lower viscosity, while a wide viewing angle and a low driving voltage can be achieved. The invention also provides a method for preparing the composite, and a LCD device comprising the composite. The method of the present invention is simple and efficient.

18 Claims, 4 Drawing Sheets

COMPOSITE COMPRISING A POLYMER AND A BLUE PHASE LIQUID CRYSTAL, A METHOD FOR PREPARING THE COMPOSITE, AND A LIQUID CRYSTAL DISPLAY DEVICE COMPRISING THE COMPOSITE

FIELD OF THE INVENTION

The present invention relates to the field of liquid crystal display (LCD) technology. More particularly, the present invention relates to a composite comprising a polymer and a blue phase liquid crystal (BPLC), a method for preparing the composite, and a LCD device comprising the composite.

BACKGROUND OF THE INVENTION

The global depletion of the non-renewable energy resources has rapidly increased in recent years. How to improve the energy efficiency has become a worldwide issue. In China, the energy-saving issue is much more prominent. According to a recent statistic, the total amount of LCD televisions being used in China exceeds 100 million, and will reach 3.4 billion in the next 58 years. By then, the annual power consumption of the televisions will exceed 50 billion kilowatt-hours (kWh) with ⅔ thereof being consumed by the displays. Since the LCD has become the most popular display medium in the world, the technical issues of reducing energy consumption of the LCD have become a worldwide important topic and task in the field of display technology.

Energy consumption of an LCD arises mainly from the backlight, the driving mode, the liquid crystal material and the peripheral components thereof. Among next-generation LCD technologies, the most attractive one is the blue phase liquid crystal display (BP-LCD) technology. The BP-LCD has the following four outstanding advantages over the conventional LCD technologies. First, the blue phase liquid crystal exhibits a fast response at microsecond level to an electric field, is applicable to a field sequential driving mode, and does not need a color filter. Second, the blue phase liquid crystal macroscopically exhibits optical isotropy, so that the alignment of the inner surface of a display substrate is no longer required. Third, the BP-LCDs can provide a relatively wide viewing performance and do not need any viewing angle compensation film. Fourth, the transmittance of the light from the backlights of the BP-LCDs is insensitive to the substrate gap, and thus the substrate gap does not need to be strictly controlled during the fabrication process. Such a feature of the BP-LCDs can greatly simplify the fabrication process and is useful for manufacturing large LCD panels.

As compared with a conventional LCD, a BP-LCD may reduce the backlight power consumption by about ⅓, the energy consumption during its fabrication may reduce by about 40%, and the cost of raw materials thereof may reduce by about 19%. Since the techniques and processes of manufacturing a BP-LCD are similar to that of the conventional LCD, they can be produced by the same manufacturing facilities. So, the key points of improving the BP-LCD technology reside in the development of blue phase liquid crystal (BPLC) materials.

In 2002, YANG Huai and Kikuchi, at al., reported a polymer-stabilized BPLC composite. Based on the composite, Samsung produced the first polymer-stabilized BP-LCD prototype in the world. The prototype was exhibited at the Display Week 2008 and aroused great repercussions in the display field. This polymer-stabilized BP-LCD can realize an image-driving speed of 240 Hz or greater, and thus can provide a naturally-appearing moving imagery. Therefore, the development of polymer-stabilized BPLCs is becoming the focus of the attentions in the art of manufacturing LCDs.

It is known that a polymer-dispersed liquid crystal is a composite formed by uniformly dispersing nematic liquid crystal droplets in a polymer matrix. Because the polymer-dispersed liquid crystal has excellent electro-optical properties and is easy to achieve large-scale production, it has been widely used in large-size flexible display devices, non-linear optical materials, electronically-controlled smart glass, liquid crystal gratings and so on. However, there are two main obstacles for manufacturing LCDs based on the polymer-stabilized BPLCs, including: (1) it is difficult to manufacture large panel with high uniformity using the polymer-stabilized BPLCs of wide temperature range; and (2) the microstructure of the polymer network is difficult to control precisely, and the life of the LCDs based on the polymer-stabilized BPLCs may be shortened significantly because the amount of the monomers used for polymerization is usually less than 10 wt % such that the resultant polymer network tends to deform under the effect of an applied electric field.

Therefore, in the field of LCDs, there is a great demand for the development of a useful BPLC, which can exhibit a wide temperature range, a lower driving voltage and a higher stability in electric field.

SUMMARY OF THE INVENTION

To overcome the defects of the prior art, the present invention provides a novel composite comprising a polymer and a BPLC, a method of preparing the composite, and a LCD device comprising the composite.

According to one aspect of the present invention, a composite comprising a polymer and a blue phase liquid crystal is provided. The composite is characterized in that the polymer is a crosslinked and non-liquid crystalline polymer, the blue phase liquid crystal is dispersed in said polymer, and the ratio of the polymer to the blue phase liquid crystal by weight ($W_p/W_l$) satisfies the relationship $12:88<W_p/W_l\leq30:70$, wherein the $W_p$ is the weight of the polymer, and $W_l$ is the weight of the blue phase liquid crystal. Preferably, the ratio of the polymer to the blue phase liquid crystal by weight ($W_p/W_l$) satisfies $15:85\leq W_p/W_l\leq25:75$, and most preferably the ratio $W_p/W_l$ is 20:80.

According to another aspect of the present invention, a method is provided to prepare the composite comprising a polymer and a blue phase liquid crystal. The method includes the following steps:

blending a non-liquid crystalline compound having a photopolymerizable functional group with the blue phase liquid crystal at a ratio $W_c/W_l$ to form a blend, wherein the $W_c$ is the weight of the non-liquid crystalline compound, $W_l$ is the weight of the blue phase liquid crystal; and the ratio $W_c/W_l$ satisfies the relationship: $12:88<W_c/W_l\leq30:70$;

adding a photoinitiator into the blend to form a reactive mixture; and while keeping the blue phase liquid crystal in the reactive mixture in the blue phase, radiating the reactive mixture with a light (preferable a UV-light) so that a polymer network is formed through a crosslinking reaction between the non-liquid crystalline compound having a photopolymerizable functional group, and thereby forming a composite comprising the polymer and the blue phase liquid crystal.

In the present invention, the blue phase liquid crystal prefers to be a blue phase liquid crystal which exhibits a temperature range of blue phase of more than 5.0° C., and has a viscosity of 34 to 45 mPa·s, a melting point of −20° C. to −15° C., and a clearing point of 68 to 88° C.

In the present invention, it is preferably that the ratio $W_c/W_l$ satisfies $15:85 \leq W_c/W_l \leq 25:75$, and more preferably the ratio $W_c/W_l$ is 20:80.

In the present invention, said non-liquid crystalline compound having a photopolymerizable functional group is a monomer for forming the polymer contained in the composite of the present invention. The monomer preferably comprises at least one multifunctional (methyl)acrylate and at least one monofunctional (methyl)acrylate, each of which is a photopolymerizable compound.

In the present invention, the ratio of the total monofunctional (methyl)acrylate to the total multifunctional (methyl)acrylate on a molar basis is 1:1 to 1:9, and preferably is 1:4.

In the method of the present invention, the amount of the photoinitiator is 0.5% to 1.5% by weight, in relative to the total amount of the non-liquid crystalline compound having a photopolymerizable functional group.

Preferably, said photoinitiator is a UV-light initiator. With the irradiation of a UV-light, the photo-polymerizable compound (monomer) undergoes polymerization and crosslinking, so as to form a polymer network, and thereby giving the composite of the present invention.

According to another aspect of the present invention, a liquid crystal display device is provided. The device comprises a pair of substrates and the composite of the present invention. At least one of the substrates has an electrode formed thereon, and the composite is enclosed and sealed between the pair of substrates.

The present invention provides at least the following advantageous technical effects:

The composite of the present invention has a very wide temperature range of blue phase of the BPLC, and can also respond to an electric field at a millisecond level. On the other hand, a wide viewing angle and a low driving voltage can also be achieved. The composite of the present invention has an excellent stability, a lower viscosity, and a fast response speed to an electric field. The method for preparing the composite according to the present invention is simple and efficient. Therefore, the present invention has an important theoretical significance and a practical value in designing and developing a new and useful BPLC composite.

BRIEF DESCRIPTION OF THE DRAWINGS

FIG. 1 shows the structural formulas of non-liquid crystal compounds having photopolymerizable functional group(s), wherein:

FIG. 1-1 shows the formula of a monofunctional polymerizable monomer, (2,2,5-trimethyl)hexyl acrylate (TMHA);

FIG. 1-2 shows the formula of a bifunctional polymerizable monomer, butanediol diacrylate (BDDA);

FIG. 1-3 shows the formula of a trifunctional polymerizable monomer, trimethylolpropane triacrylate (TMPTA);

DETAILED DESCRIPTION OF CERTAIN EMBODIMENTS

The present invention relates to a composite comprising a polymer and a blue phase liquid crystal. The polymer is a crosslinked and non-liquid crystalline polymer, and the blue phase liquid crystal is dispersed in said polymer.

In the composite, it is preferably that the ratio of the polymer to the blue phase liquid crystal by weight $(W_p/W_l)$ satisfies the relationship $12:88 < W_p/W_l \leq 30:70$, wherein the $W_p$ is the weight of the polymer, and $W_l$ is the weight of the blue phase liquid crystal. More preferably, the ratio $W_p/W_l$ satisfies $15:85 \leq W_p/W_l \leq 25:75$, and most preferably the ratio $W_p/W_l$ is 20:80.

The present invention also relates to a method for preparing the composite comprising a polymer and a blue phase liquid crystal. The method includes the following steps:

blending a non-liquid crystalline compound having a photopolymerizable functional group with the blue phase liquid crystal at a ratio $W_c/W_l$ to form a blend, wherein the $W_c$ is the weight of the non-liquid crystalline compound, $W_l$ is the weight of the blue phase liquid crystal; and the ratio $W_c/W_l$ satisfies the relationship: $12:88 < W_c/W_l \leq 30:70$;

adding a photoinitiator into the blend to form a reactive mixture; and while keeping the blue phase liquid crystal in the reactive mixture in the blue phase, radiating the reactive mixture with a light (preferable a UV-light) so that a polymer network is formed through a crosslinking reaction between the non-liquid crystalline compound having a photopolymerizable functional group, and thereby forming a composite comprising the polymer and the blue phase liquid crystal.

In the present invention, the blue phase liquid crystal prefers to be a blue phase liquid crystal which exhibits a temperature range of blue phase of more than 5.0° C., and has a viscosity of 34 to 45 mPa·s, a melting point of −20° C. to −15° C., and a clearing point of 68 to 88° C.

In the present invention, it is preferably that the ratio $W_c/W_l$ satisfies $15:85 \leq W_c/W_l \leq 25:75$, and more preferably the ratio $W_c/W_l$ is 20:80.

In the present invention, said non-liquid crystalline compound having a photopolymerizable functional group is a monomer for forming the polymer contained in the composite of the present invention. The monomer preferably comprises at least one multifunctional (methyl)acrylate and at least one monofunctional (methyl)acrylate, each of which is a photopolymerizable compound.

In the present invention, the ratio of the total monofunctional (methyl)acrylate to the total multifunctional (methyl)acrylate on a molar basis is 1:1 to 1:9, and preferably is 1:4.

In the present invention, the term "photopolymerizable" means that the polymerizable monomer undergoes a polymerization and crosslinking reaction under the irradiation of a light, and it usually means a polymerization under the irradiation of ultraviolet (UV) light.

In the present invention, the term "(methyl)acrylate" refers to a photopolymerizable compound having a (methyl)acryl group, preferably a (methyl)acrylate group. Herein, the term "(methyl)acrylate" means both acrylate and methacrylate. The (methyl)acrylate is a monofunctional or a multifunctional (methyl)acrylate. The multifunctional (methyl)acrylate useful in the present invention includes but is not limited to a photopolymerizable compound having 2 or 3 (methyl)acrylate groups, and for example, may be selected from the group consisting of butanediol diacrylate (BDDA), trimethylolpropane triacrylate (TMPTA), 4-[2-methyl-4-(4-acryloxylpropoxy)benzoyloxy]phenoxycarbonyl-phenoxylpropyl acrylate and a combination thereof. The monofunctional (methyl)acrylate useful in the present invention includes but is not limited to a photopolymerizable compound having 1 (methyl) acrylate group, and for example, may be selected from the group consisting of (2,2,5-trimethyl)hexyl acrylate (TMHA), (2-ethyl)hexyl acrylate, and a combination thereof.

In the method of the present invention, the photoinitiator is used in an amount sufficient to initiate the polymerization reaction. Usually, the amount of the photoinitiator is 0.5% to 1.5% by weight, in relative to the total amount of the non-liquid crystalline compound having a photopolymerizable functional group.

Preferably, said photoinitiator is a UV-light initiator. With the irradiation of a UV-light, the photo-polymerizable compound (monomer) undergoes polymerization and crosslinking reaction, so as to form a polymer network, and thereby giving the composite of the present invention.

In the method of the present invention, the irradiation can be usually carried out at a dosage of 2-10 mW/cm$^2$, for a time period of several minutes to several hours, usually 0.5 hour or more, for example, 0.5-5 h, 0.5-3 h, or 0.5-1 h.

The present invention also relates to a liquid crystal display device, which comprises a pair of substrates and the composite of the present invention. At least one of the substrates has an electrode formed thereon, and the composite is enclosed and sealed between the pair of substrates.

The composite, the method for preparing the composite and the LCD device of the present invention will be illustrated in detail by the following Examples. But the present invention is not limited thereto.

Example 1

Step 1: Preparation of a BPLC Exhibiting a Wide Temperature Range

The BPLC used in this example consists of 82.0 wt % of SLC-X (a mixed crystal, which is a product of Yongsheng-Huatsing Liquid Crystal Co., Ltd, $\Delta n=0.235$, $\Delta\varepsilon=29.6$ at 298 K), 10.0 wt % of R811 and 8.0 wt % of Iso-(6OBA)$_2$. The BPLC exhibits a temperature range of blue phase of about 10.0° C. The chiral compound R811 and Iso-(6OBA)$_2$ (commercially available from Merk GmbH, Germany) are represented by the following structural formulas:

The BPLC has a viscosity of 35 mPa·s, a melting point of −15° C., and a clearing point of 86° C.

The BPLC was prepared by the following procedures:

The 82.0 wt % of SLC-X, 10.0 wt % of R811 and 8.0 wt % of Iso-(6OBA)$_2$ were mixed together and then heated to a temperature above the clearing point (higher than the clearing point by about 5-10° C.), and maintained for about 30 minutes with sufficient agitation by a magnetic stirrer. Thus, the desired BPLC material was obtained.

Step 2: Preparation of a Reaction Mixture

Figures 1, 11, 12, 13:
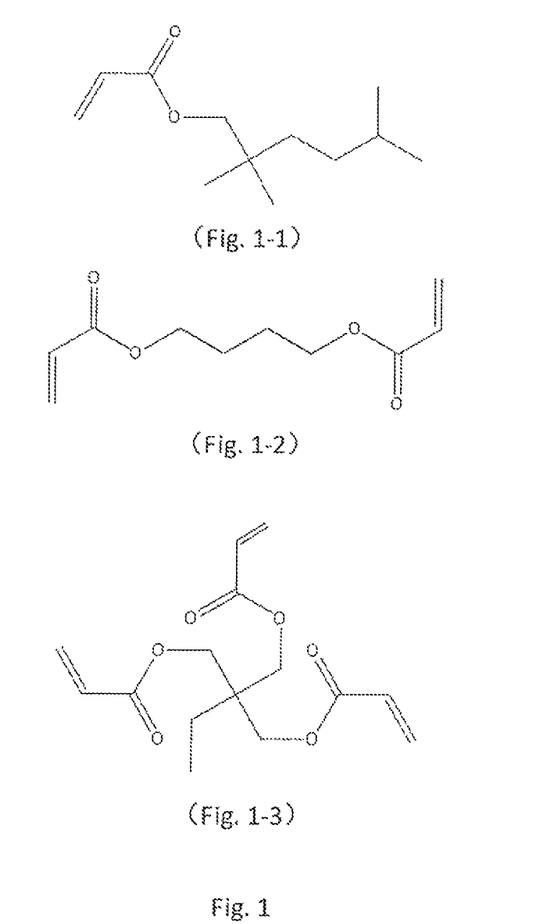
Figure 2:
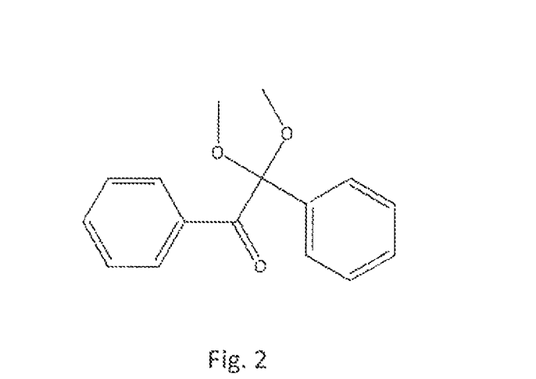
FIG. 2 shows the structural formula of a photoinitiator.

TMHA and BDDA (which structures are shown in FIG. 1) were employed as polymeric monomers (that is, the non-liquid crystalline compounds having photopolymerizable functional group(s)) and the ratio on a molar basis of TMHA/BDDA was 1:4. A blend was prepared by blending the polymeric monomers with the BPLC material at a mixing ratio by weight of 30:70 at room temperature. Then into the blend, a photoinitiator (which structure is shown in FIG. 2) was added at a ratio by weight of about 1% based on the total amount of the non-liquid crystalline compounds having photopolymerizable functional group(s). Upon stirring sufficiently, a homogeneous reactive mixture was obtained.

Step 3: Preparation of a Composite

The homogeneous reactive mixture obtained in Step 2 was injected into a liquid crystal cell by means of siphon action to prepare a sample. The liquid crystal cell is a IPS cell, with the electrode width being 5.0 micrometers, the distance between the electrodes being 5.0 micrometers, and the cell gap being maintained at 10.0 micrometers by spacers. The sample was kept on a heating stage (Linkam LK-600PM) of which the temperature was precisely controlled with an accuracy of 0.1° C., so that the BPLC maintained in the blue phase. The sample was irradiated with a UV light at a dosage of 5 mW/cm$^2$ for 40 minutes. The non-liquid crystalline compounds having photopolymerizable functional group(s) proceeded to perform a crosslinking reaction to form a polymer network, and thus, the composite of Example 1 was obtained.

Step 4: Measurement of the Properties of the Composite

The BPLC texture of the composite was observed with a polarizing microscope equipped with a heating stage and the phase transition temperature was determined. The electro-optical properties of the composite were determined by a Liquid Crystal Parameters Tester (LCT-5016C, Changchun Liancheng Instrument Co. Ltd.).

The electro-optical properties of the composite prepared according to the present invention were tested by a process described below. The test of the electro-optical properties was mainly performed to measure the electrically-induced birefringence, $\Delta n_{induced}$, of each of the composites.

Macroscopically, the composite of the present invention is optically isotropic when no external electric field (E) is applied. With increase of the electric field applied, the composite becomes anisotropic along the direction of the electric field. Such electrically-induced birefringence phenomenon follows the Kerr effect, that is, within a certain range of field strength, the birefringence $\Delta n_{induced}$ induced by an electric field and the electric field strength E, the detection wavelength $\lambda$, and the Kerr constant K of a material satisfy the following relationship:

$$\Delta n_{induced}=\lambda KE^2 \quad (1)$$

In order to measure the $\Delta n_{induced}$ of the composite of the present invention, the reactive mixture prepared by Step 2 was injected by means of siphon action into a liquid crystal cell provided with in-plane electrodes (IPS cell, with the electrode width being 5.0 micrometers, the distance between the electrodes being 5.0 micrometers, and the cell gap being maintained at 10.0 micrometers by spacers). The resultant sample was oriented at an angle of 45' with respect to the direction of incident light. The temperature was precisely controlled (with an accuracy of 0.1° C.) by a heating stage (Linkam LK-600PM). To measure the electrically-induced birefringence $\Delta n_{induced}$, a rectangular alternating current with a frequency of 60 Hz supplied by a power amplifier and a function generator was applied between the two electrodes of the IPS cell. The sample liquid crystal cell was placed between two crossed polarizers, and the intensity of the light transmitted through the liquid crystal cell was detected by a photodiode. The output intensity $I_{out}$ is expressed by Equation (2):

$$I_{out} = I_{in} \sin^2(\phi/2) \quad (2)$$

wherein $I_{in}$ is the intensity of incident light, $I_{out}$ is the intensity of output light, $\phi$ is the optical retardation angle. The induced birefringence, $\Delta n_{induced}$, can be calculated by Equation (3):

$$\phi = 2\pi \Delta n_{induced} d/\lambda \quad (3)$$

wherein d is the length of the light path, i.e., the gap between the top and bottom substrates of the liquid crystal cell.

Figure 4:
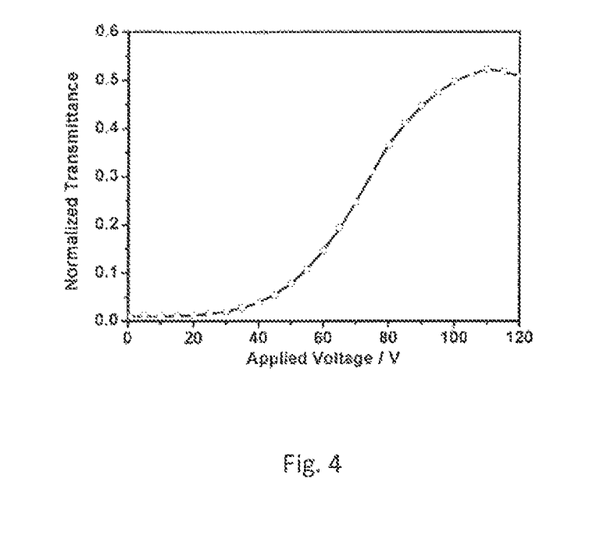
FIG. 4 is a graph showing the voltage-transmittance curve of the composite prepared by Example 1.

The composite was observed with the polarizing microscope and confirmed to have a BPLC texture. The phase transition temperature was also determined with the polarizing microscope. The composite of Example 1 was found to have a temperature range of blue phase greater than 60° C. (about from 10° C. to 70° C.). The electro-optical properties of the composite were measured with the Liquid Crystal Parameters Tester, and FIG. 4 shows the voltage-transmittance curve of the composite. The transmittance shown in the figure is normalized with the transmittance of the air which is 100%. The driving voltage of the composite sample is determined as the voltage corresponding to the transmittance peak in the voltage-transmittance curve. The response speed is determined as the sum of the response time during ON state and OFF state. As a result, the composite sample exhibited a driving voltage of about 110 V and a response speed of less than 1 ms.

Comparative Example

Step 1: Preparation of a BPLC Exhibiting a Wide Temperature Range

The BPLC used in this example consists of 82.0 wt % of SLC-X (a mixed crystal, which is a product of Yongsheng-Huatsing Liquid Crystal Co., Ltd, $\Delta n$=0.235, $\Delta \epsilon$=29.6 at 298 K), 10.0 wt % of R811 and 8.0 wt % of Iso-(6OBA)$_2$. The BPLC exhibits a temperature range of blue phase of about 10.0° C. The chiral compound R811 and iso-(6OBA)$_2$ (commercially available from Merk GmbH, Germany) are represented by the following structural formulas:

R811

Iso-(6OBA)$_2$

The BPLC has a viscosity of 35 mPa·s, a melting point of −15° C., and a clearing point of 86° C.

The BPLC was prepared by the following procedures:

The 82.0 wt % of SLC-X, 10.0 wt % of R811 and 8.0 wt % of Iso-(6OBA)$_2$ were mixed together and then heated to a temperature above the clearing point (higher than the clearing point by about 5-10° C.), and maintained for about 30 minutes with sufficient agitation by a magnetic stirrer. Thus, the desired BPLC material was obtained.

Step 2: Preparation of a Reaction Mixture

TMHA and BDDA (which structures are shown in FIG. 1) were employed as polymeric monomers (that is, the non-liquid crystalline compounds having photopolymerizable functional group(s)) and the ratio on a molar basis of TMHA/BDDA was 1:4. A blend was prepared by blending the polymeric monomers with the BPLC material at a mixing ratio by weight of 10:90 at room temperature. Then into the blend, a photoinitiator (which structure is shown in FIG. 2) was added at a ratio by weight of about 1% based on the total amount of the non-liquid crystalline compounds having photopolymerizable functional group(s). Upon stirring sufficiently, a homogeneous reactive mixture was obtained.

Step 3: Preparation of a Composite

The homogeneous reactive mixture obtained in Step 2 was injected into a liquid crystal cell by means of siphon action to prepare a sample. The liquid crystal cell is a IPS cell, with the electrode width being 5.0 micrometers, the distance between the electrodes being 5.0 micrometers, and the cell gap being maintained at 10.0 micrometers by spacers. The sample was kept on a heating stage (Linkam LK-600PM) of which the temperature was precisely controlled with an accuracy of 0.1° C., so that the BPLC maintained in the blue phase. The sample was irradiated with a UV light at a dosage of 5 mW/cm² for 30 minutes. The non-liquid crystalline compounds having photopolymerizable functional group(s) proceeded to perform a crosslinking reaction to form a polymer network, and thus, the composite of Comparative Example was obtained.

Step 4: Measurement of the Properties of the Composite

Figure 3:
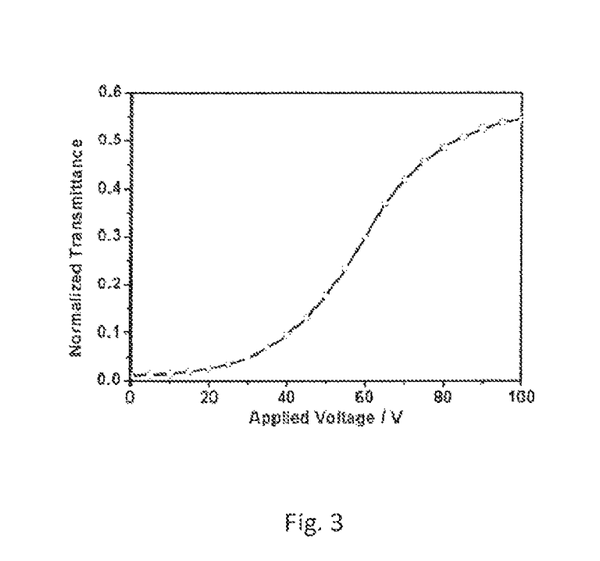
FIG. 3 is a graph showing the voltage-transmittance curve of the composite prepared by the Comparative Example.

The resultant composite was observed with the polarizing microscope equipped with a heating stage according to the same method as described in Example 1. The composite was confirmed to have a BPLC texture and the phase transition temperature was determined. The composite of this Comparative Example was found to have a temperature range of blue phase greater than 30° C. (about from 20° C. to 50° C.). The electro-optical properties of the composite were measured by a Liquid Crystal Parameters Tester according to the same method as described in Example 1, and FIG. 3 shows the voltage-transmittance curve of the composite. As a result, the composite sample exhibited a driving voltage of about 100 V and a response speed of less than 1 ms.

Example 2

Step 1: Preparation of a BPLC Exhibiting a Wide Temperature Range

The BPLC used in this example consists of 60.0 wt % of SLC-1717 (a mixed crystal, which is a product of YongshengHuatsing Liquid Crystal Co., Ltd, $\Delta n$=0.22, $\Delta \epsilon$=12.2 at 298 K), and 40.0 wt % of R811. The BPLC exhibits a temperature range of blue phase of about 8.0° C. The chiral compound R811 is represented by the following structural formula:

R811

The BPLC has a viscosity of 45 mPa·s, a melting point of −20° C., and a clearing point of 68° C.

The BPLC was prepared by the following procedures:

The 60.0 wt % of SLC-1717 and 40.0 wt % of R811 were mixed together and then heated to a temperature above the clearing point (higher than the clearing point by about 5-10° C.), and maintained for about 30 minutes with sufficient agitation by a magnetic stirrer. Thus, the desired BPLC material was obtained.

Step 2: Preparation of a Reaction Mixture

TMHA and TMPTA (which structures are shown in FIG. 1) were employed as polymeric monomers (that is, the non-liquid crystalline compounds having photopolymerizable functional group(s)) and the ratio on a molar basis of TMHA/TMPTA was 1:4. A blend was prepared by blending the polymeric monomers with the BPLC material at a mixing ratio by weight of 30:70 at room temperature. Then into the blend, a photoinitiator (which structure is shown in FIG. 2) was added at a ratio by weight of about 1% based on the total amount of the non-liquid crystalline compounds having photopolymerizable functional group(s). Upon stirring sufficiently, a homogeneous reactive mixture was obtained.

Step 3: Preparation of a Composite

The homogeneous reactive mixture obtained in Step 2 was injected into a liquid crystal cell by means of siphon action to prepare a sample. The liquid crystal cell is a IPS cell, with the electrode width being 5.0 micrometers, the distance between the electrodes being 5.0 micrometers, and the cell gap being maintained at 10.0 micrometers by spacers. The sample was kept on a heating stage (Linkam LK-600PM) of which the temperature was precisely controlled with an accuracy of 0.1° C., so that the BPLC maintained in the blue phase. The sample was irradiated with a UV light at a dosage of 5 mW/cm² for 30 minutes. The non-liquid crystalline compounds having photopolymerizable functional group(s) proceeded to perform a crosslinking reaction to form a polymer network, and thus, the composite of Example 2 was obtained.

Step 4: Measurement of the Properties of the Composite

Figure 5:
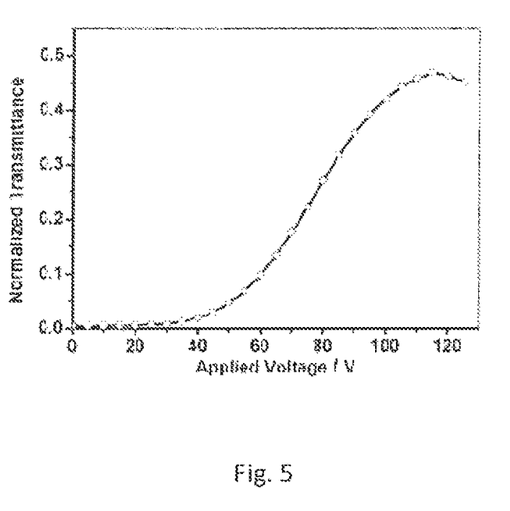
FIG. 5 is a graph showing the voltage-transmittance curve of the composite prepared by Example 2.

The resultant composite was observed with the polarizing microscope equipped with a heating stage according to the same method as described in Example 1. The composite was confirmed to have a BPLC texture and the phase transition temperature was determined. The composite of this Example was found to have a temperature range of blue phase greater than 70° C. (about from 5° C. to 75° C.). The electro-optical properties of the composite were measured by a Liquid Crystal Parameters Tester according to the same method as described in Example 1, and FIG. 5 shows the voltage-transmittance curve of the composite. As a result, the composite sample exhibited a driving voltage of about 120 V and a response speed of less than 1 ms.

Example 3

Step 1: Preparation of a BPLC Exhibiting a Wide Temperature Range

The BPLC used in this example consists of 92.0 wt % of SLC-X (a mixed crystal, which is a product of Yongsheng-Huatsing Liquid Crystal Co., Ltd, $\Delta n$=0.235, $\Delta \epsilon$=29.6 at 298 K), and 8.0 wt % of Iso-(6OBA)$_2$. The BPLC exhibits a temperature range of blue phase of about 5.0° C.

The BPLC has a viscosity of 34 mPa·s, a melting point of −16° C., and a clearing point of 88° C.

The BPLC was prepared by the following procedures:

The 92.0 wt % of SLC-X and 8.0 wt % of Iso-(6OBA)$_2$ were mixed together and then heated to a temperature above the clearing point (higher than the clearing point by about 5-10° C.), and maintained for about 30 minutes with sufficient agitation by a magnetic stirrer. Thus, the desired BPLC material was obtained.

Step 2: Preparation of a Reaction Mixture

TMHA, BDDA and TMPTA (which structures are shown in FIG. 1) were employed as polymeric monomers (that is, the non-liquid crystalline compounds having photopolymerizable functional group(s)) and the ratio on a molar basis of TMHA/BDDA/TMPTA was 1:2:3. A blend was prepared by blending the polymeric monomers with the BPLC material at a mixing ratio by weight of 20:80 at room temperature. Then into the blend, a photoinitiator (which structure is shown in FIG. 2) was added at a ratio by weight of about 1% based on the total amount of the non-liquid crystalline compounds having photopolymerizable functional group(s). Upon stirring sufficiently, a homogeneous reactive mixture was obtained.

Step 3: Preparation of a Composite

The homogeneous reactive mixture obtained in Step 2 was injected into a liquid crystal cell by means of siphon action to prepare a sample. The liquid crystal cell is a IPS cell, with the electrode width being 5.0 micrometers, the distance between the electrodes being 5.0 micrometers, and the cell gap being maintained at 10.0 micrometers by spacers. The sample was kept on a heating stage (Linkam LK-600PM) of which the temperature was precisely controlled with an accuracy of 0.1° C., so that the BPLC maintained in the blue phase. The sample was irradiated with a UV light at a dosage of 5 mW/cm² for 30 minutes. The non-liquid crystalline compounds having photopolymerizable functional group(s) proceeded to perform a crosslinking reaction to form a polymer network, and thus, the composite of Example 3 was obtained.

Step 4: Measurement of the Properties of the Composite

Figure 6:
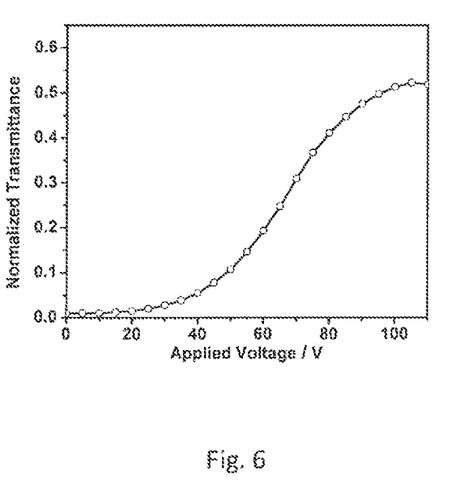
FIG. 6 is a graph showing the voltage-transmittance curve of the composite prepared by Example 3.

The resultant composite was observed with the polarizing microscope equipped with a heating stage according to the same method as described in Example 1. The composite was confirmed to have a BPLC texture and the phase transition temperature was determined. The composite of this Example was found to have a temperature range of blue phase greater than 60° C. (about from 10° C. to 70° C.). The electro-optical properties of the composite were measured by a Liquid Crystal Parameters Tester according to the same method as described in Example 1, and FIG. 6 shows the voltage-transmittance curve of the composite. As a result, the composite sample exhibited a driving voltage of about 105 V and a response speed of less than 1 ms.

Example 4

Step 1: Preparation of a BPLC Exhibiting a Wide Temperature Range

The BPLC used in this example consists of 92.0 wt % of SLC-X (a mixed crystal, which is a product of Yongsheng-Huatsing Liquid Crystal Co., Ltd, $\Delta n=0.235$, $\Delta \epsilon=29.6$ at 298 K), and 8.0 wt % of Iso-(6OBA)$_2$. The BPLC exhibits a temperature range of blue phase of about 5.0° C.

The BPLC has a viscosity of 34 mPa·s, a melting point of −16° C., and a clearing point of 88° C.

The BPLC was prepared by the following procedures:

The 92.0 wt % of SLC-X and 8.0 wt % of Iso-(6OBA)$_2$ were mixed together and then heated to a temperature above the clearing point (higher than the clearing point by about 5-10° C.), and maintained for about 30 minutes with sufficient agitation by a magnetic stirrer. Thus, the desired BPLC material was obtained.

Step 2: Preparation of a Reaction Mixture

TMHA, BDDA and TMPTA (which structures are shown in FIG. 1) were employed as polymeric monomers (that is, the non-liquid crystalline compounds having photopolymerizable functional group(s)) and the ratio on a molar basis of TMHA/BDDA/TMPTA was 2:1:1. A blend was prepared by blending the polymeric monomers with the BPLC material at a mixing ratio by weight of 20:80 at room temperature. Then into the blend, a photoinitiator (which structure is shown in FIG. 2) was added at a ratio by weight of about 1% based on the total amount of the non-liquid crystalline compounds having photopolymerizable functional group(s). Upon stirring sufficiently, a homogeneous reactive mixture was obtained.

Step 3: Preparation of a Composite

The homogeneous reactive mixture obtained in Step 2 was injected into a liquid crystal cell by means of siphon action to prepare a sample. The liquid crystal cell is a IPS cell, with the electrode width being 5.0 micrometers, the distance between the electrodes being 5.0 micrometers, and the cell gap being maintained at 10.0 micrometers by spacers. The sample was kept on a heating stage (Linkam LK-600PM) of which the temperature was precisely controlled with an accuracy of 0.1° C., so that the BPLC maintained in the blue phase. The sample was irradiated with a UV light at a dosage of 5 mW/cm$^2$ for 30 minutes. The non-liquid crystalline compounds having photopolymerizable functional group(s) proceeded to perform a crosslinking reaction to form a polymer network, and thus, the composite of Example 4 was obtained.

Step 4: Measurement of the Properties of the Composite

Figure 7:
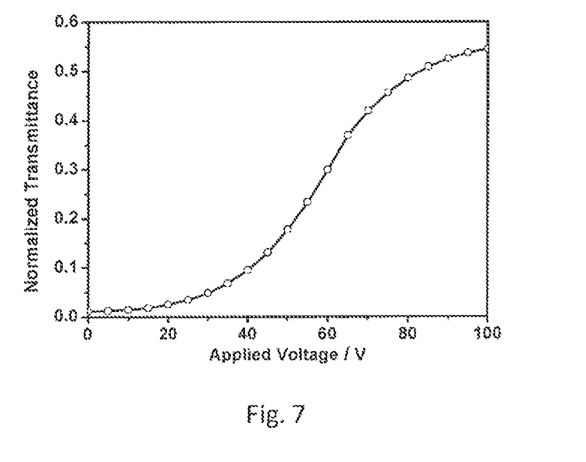
FIG. 7 is a graph showing the voltage-transmittance curve of the composite prepared by Example 4.

The resultant composite was observed with the polarizing microscope equipped with a heating stage according to the same method as described in Example 1. The composite was confirmed to have a BPLC texture and the phase transition temperature was determined. The composite of this Example was found to have a temperature range of blue phase greater than 60° C. (about from 10° C. to 70° C.). The electro-optical properties of the composite were measured by a Liquid Crystal Parameters Tester according to the same method as described in Example 1, and FIG. 7 shows the voltage-transmittance curve of the composite. As a result, the composite sample exhibited a driving voltage of about 100 V and a response speed of less than 1 ms.

Example 5

Step 1: Preparation of a BPLC Exhibiting a Wide Temperature Range

The BPLC used in this example consists of 92.0 wt % of SLC-X (a mixed crystal, which is a product of Yongsheng-Huatsing Liquid Crystal Co., Ltd, $\Delta n=0.235$, $\Delta \epsilon=29.6$ at 298 K), and 8.0 wt % of Iso-(6OBA)$_2$. The BPLC exhibits a temperature range of blue phase of about 5.0° C.

The BPLC has a viscosity of 34 mPa·s, a melting point of −16° C. and a clearing point of 88° C.

The BPLC was prepared by the following procedures:

The 92.0 wt % of SLC-X and 8.0 wt % of Iso-(6OBA)$_2$ were mixed together and then heated to a temperature above the clearing point (higher than the clearing point by about 5-10° C.), and maintained for about 30 minutes with sufficient agitation by a magnetic stirrer. Thus, the desired BPLC material was obtained.

Step 2: Preparation of a Reaction Mixture

TMHA, BDDA and TMPTA (which structures are shown in FIG. 1) were employed as polymeric monomers (that is, the non-liquid crystalline compounds having photopolymerizable functional group(s)) and the ratio on a molar basis of TMHA/BDDA/TMPTA was 1:4:5. A blend was prepared by blending the polymeric monomers with the BPLC material at a mixing ratio by weight of 20:80 at room temperature. Then into the blend, a photoinitiator (which structure is shown in FIG. 2) was added at a ratio by weight of about 1% based on the total amount of the non-liquid crystalline compounds having photopolymerizable functional group(s). Upon stirring sufficiently, a homogeneous reactive mixture was obtained.

Step 3: Preparation of a Composite

The homogeneous reactive mixture obtained in Step 2 was injected into a liquid crystal cell by means of siphon action to prepare a sample. The liquid crystal cell is a IPS cell, with the electrode width being 5.0 micrometers, the distance between the electrodes being 5.0 micrometers, and the cell gap being maintained at 10.0 micrometers by spacers. The sample was kept on a heating stage (Linkam LK-600PM) of which the temperature was precisely controlled with an accuracy of 0.1° C., so that the BPLC maintained in the blue phase. The sample was irradiated with a UV light at a dosage of 5 mW/cm$^2$ for 30 minutes. The non-liquid crystal compounds having photopolymerizable functional group(s) proceeded to perform a crosslinking reaction to form a polymer network, and thus, the composite of Example 5 was obtained.

Step 4: Measurement of the Properties of the Composite

Figure 8:
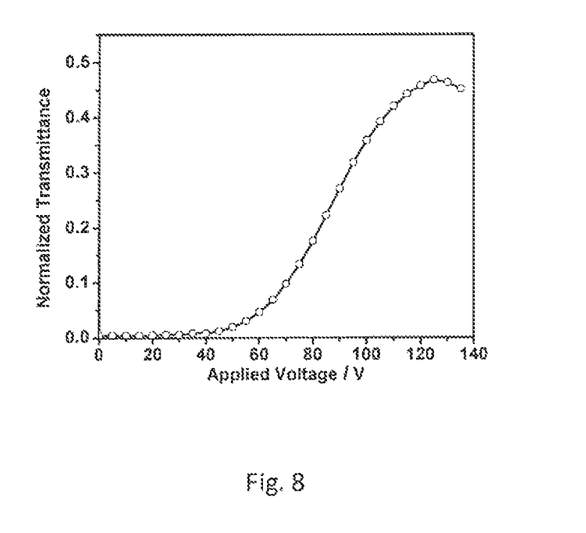
FIG. 8 is a graph showing the voltage-transmittance curve of the composite prepared by Example 5.

The resultant composite was observed with the polarizing microscope equipped with a heating stage according to the same method as described in Example 1. The composite was confirmed to have a BPLC texture and the phase transition temperature was determined. The composite of this Example was found to have a temperature range of blue phase greater than 70° C. (about from 5° C. to 75° C.). The electro-optical properties of the composite were measured by a Liquid Crystal Parameters Tester according to the same method as described in Example 1, and FIG. 8 shows the voltage-transmittance curve of the composite. As a result, the composite sample exhibited a driving voltage of about 130 V and a response speed of less than 1 ms.

The Examples described above reveal that the method of the present invention can provide a composite comprising a polymer and a BPLC, which exhibits a very wide temperature range of blue phase, and has a fast response speed to the electrical filed (at a sub-millisecond level), a lower driving voltage as well as a good stability in the wide temperature range. Since the viscosity of the mixed crystal is low, the BPLC can be easily dispersed in the polymer network. Therefore, based on the method of the present invention, it is possible to develop a liquid crystal product having a large size and high homogeneity. In addition, the composite prepared by the present invention may have a higher polymer content, as compared with the known polymer-stabilized BPLC composite material. Thus, the deformation of the polymer network under an electrical filed can be effectively prevented, and the microstructure of the polymer network can be precisely controlled by adjusting the monomers of the polymer.

The present invention further provides a liquid crystal display device, which comprises a pair of substrates wherein at least one of the substrates has an electrode formed thereon; and the composite being enclosed and sealed between the substrates. The display device may be a liquid crystal panel, or any product or a part thereof having a function of displaying, for example, a mobile phone, a tablet PC, a television, a display, a notebook computer, a digital picture frames, navigator and the like.

Obviously, those skilled in the art can make various alterations and modifications to the present invention without departing from the spirit and scope of the present invention. Thus, if the alterations and modifications fall within the scope of the claims of the present invention or equivalents thereto, the present invention also intends to encompass these alterations and modifications.

The invention claimed is:

1. A composite comprising a polymer and a blue phase liquid crystal, wherein the polymer is a crosslinked and non-liquid crystalline polymer, the blue phase liquid crystal is dispersed in said polymer, and the ratio of the polymer to the blue phase liquid crystal by weight ($W_p/W_l$) satisfies the following relationship:

$$12:88 < W_p/W_l \leq 30:70,$$

wherein the $W_p$ is the weight of the polymer, and $W_l$ is the weight of the blue phase liquid crystal.

2. The composite according to claim 1, wherein the ratio of the polymer to the blue phase liquid crystal by weight ($W_p/W_l$) satisfies the following relationship:

$$15:85 \leq W_p/W_l \leq 25:75.$$

3. The composite according to claim 2, wherein the ratio of the polymer to the blue phase liquid crystal by weight ($W_p/W_l$) is 20:80.

4. The composite according to claim 1, wherein the polymer is derived from monomers comprising at least one photo-polymerizable multifunctional (methyl)acrylate and at least one photo-polymerizable monofunctional (methyl)acrylate.

5. The composite according to claim 4, wherein
the multifunctional (methyl)acrylate is selected from the group consisting of butanediol diacrylate (BDDA), trimethylolpropane triacrylate (TMPTA), 4-[2-methyl-4-(4-acryloxylpropoxyl)benzoyloxy]phenoxycarbonyl-phenoxylpropyl acrylate and a combination thereof; and
the monofunctional (methyl)acrylate is selected from the group consisting of (2,2,5-trimethyl)hexyl acrylate (TMHA), 2-ethylhexyl acrylate and a combination thereof.

6. The composite according to claim 4, wherein
the ratio of the total monofunctional (methyl)acrylate to the total multifunctional (methyl)acrylate on a molar basis is 1:1 to 1:9.

7. The composite according to claim 6, wherein
the ratio of the total monofunctional (methyl)acrylate to the total multifunctional (methyl)acrylate on a molar basis is 1:4.

8. A method for preparing a composite comprising a polymer and a blue phase liquid crystal, including the following steps:
blending a non-liquid crystalline compound having a photopolymerizable functional group with the blue phase liquid crystal at a ratio $W_c/W_l$ to form a blend, wherein the $W_c$ is the weight of the non-liquid crystalline compound, $W_l$ is the weight of the blue phase liquid crystal; and the ratio $W_c/W_l$ satisfies the relationship: $12:88 < W_c/W_l \leq 30:70$;
adding a photoinitiator into the blend to form a reactive mixture; and
while keeping the blue phase liquid crystal in the reactive mixture in the blue phase, radiating the reactive mixture with a light so that a polymer network is formed through a crosslinking reaction between the non-liquid crystalline compound having a photopolymerizable functional group, and thereby forming a composite comprising the polymer and the blue phase liquid crystal.

9. The method according to claim 8, wherein
the blue phase liquid crystal exhibits a temperature range of blue phase of more than 5.0° C., and has a viscosity of 34 to 45 mPa·s, a melting point of −20° C. to −15° C., and a clearing point of 68 to 88° C.

10. The method according to claim 8, wherein
the ratio $W_c/W_l$ satisfies the relationship: $15:85 \leq W_c/W_l \leq 25:75$.

11. The method according to claim 10, wherein
the ratio $W_c/W_l$ is 20:80.

12. The method according to claim 8, wherein
the non-liquid crystalline compound having a photopolymerizable functional group comprises at least one multifunctional (methyl)acrylate and at least one monofunctional (methyl)acrylate.

13. The method according to claim 12, wherein
the multifunctional (methyl)acrylate is selected from the group consisting of butanediol diacrylate (BDDA), trimethylolpropane triacrylate (TMPTA), 4-[2-methyl-4-(4-acryloxylpropoxyl)benzoyloxy]phenoxycarbonyl-phenoxylpropyl acrylate and a combination thereof; and
the monofunctional (methyl)acrylate is selected from the group consisting of (2,2,5-trimethyl)hexyl acrylate (TMHA), (2-ethyl)hexyl acrylate, and a combination thereof.

14. The method according to claim 12, wherein
among the non-liquid crystalline compound having a photopolymerizable functional group, the ratio of the total monofunctional (methyl)acrylate to the total multifunctional (methyl)acrylate on a molar basis is 1:1 to 1:9.

15. The method according to claim 14, wherein
among the non-liquid crystalline compound having a photopolymerizable functional group, the ratio of the total monofunctional (methyl)acrylate to the total multifunctional (methyl)acrylate on a molar basis is 1:4.

16. The method according to claim 8, wherein
the amount of the photoinitiator is 0.5% to 1.5% by weight, in relative to the total amount of the non-liquid crystalline compound having a photopolymerizable functional group.

17. The method according to claim 16, wherein
the photoinitiator is a UV-light initiator and the light for irradiating is a UV-light.

18. A liquid crystal display device, comprising
a pair of substrates wherein at least one of the substrates has an electrode formed thereon; and
the composite according to claim 1 being enclosed and sealed between the pair of substrates.

\* \* \* \* \*